United States Patent [19]

Gossler et al.

[11] Patent Number: 5,195,363

[45] Date of Patent: Mar. 23, 1993

[54] AUTOMATED MASS-MOMENT WEIGHING SYSTEM FOR JET ENGINE BLADES

[75] Inventors: E. Thomas Gossler; Michael A. Paul; V. Edward Stubbs, III, all of Lynchburg, Va.

[73] Assignee: The Babcock & Wilcox Company, New Orleans, La.

[21] Appl. No.: 746,373

[22] Filed: Aug. 16, 1991

[51] Int. Cl.$^5$ .............................................. G01M 1/12
[52] U.S. Cl. ............................................. 73/65; 414/21; 414/223
[58] Field of Search ............. 73/65, 456; 177/25.11, 177/25.12, 25.13, 245; 364/463, 506, 507; 414/21, 223, 225; 901/6

[56] References Cited

U.S. PATENT DOCUMENTS

| | | | |
|---|---|---|---|
| 2,060,904 | 11/1936 | Smith | 73/65 |
| 3,064,469 | 11/1962 | Price | 73/65 |
| 4,967,384 | 10/1990 | Molinar et al. | 177/25.12 |

FOREIGN PATENT DOCUMENTS

| | | | |
|---|---|---|---|
| 0149534 | 6/1988 | Japan | 73/65 |
| 557434 | 11/1943 | United Kingdom | 73/456 |
| 2185116 | 7/1987 | United Kingdom | 73/65 |

Primary Examiner—Michael T. Razavi
Assistant Examiner—Elizabeth L. Shopbell
Attorney, Agent, or Firm—Robert J. Edwards; Michael L. Hoelter

[57] ABSTRACT

This invention pertains to an automatic method and apparatus for ascertaining the mass-moment of a blade of a jet engine. It encompasses robotic means to transport the blade from its loading station to the weighing station where its mass-moment is computed via a computer. Afterwards, the blade is returned to the loading station where the cycle begins over again.

13 Claims, 12 Drawing Sheets

AUTOMATED MASS-MOMENT WEIGHING SYSTEM FOR JET ENGINE BLADES

FIELD OF THE INVENTION

This invention pertains in general to a weighing process and more particularly to a process for determining the mass-moment of the individual blades of a jet engine utilizing an automated feeding system and a new design for a balance beam.

BACKGROUND OF THE INVENTION

As can be imagined, it is vitally important to balance the rotor assembly of a jet engine so as to avoid unstable or erratic rotation. As can also be imagined, the higher the rpm involved, the more critical and accurate the balance must be.

The current level of accuracy available for jet engine blades is 0.05% of each individual blades' moment about the central axis of the jet engine (referred to as "mass-moment"). While this degree of accuracy is highly desirable, it is extremely laborious and time consuming to determine this value for each individual blade for each jet engine being manufactured or refurbished.

One current and highly sophisticated method of measuring the mass-moment of the individual blades is to attach a standard or ideal blade to a balance beam and then to record or balance out the value of this reference blade. Then, as each subsequent blade to be measured is attached to the balance beam, their variance with the reference blade is noted. This will identify any blade that falls outside the allowable range. Unfortunately, these individual blades are not subject to reworking, the purpose of determining their mass-moment is to selectively assemble a balanced rotor for the jet engine.

According to the above method, a highly accurate scale will provide an equally highly accurate value. However, in reality, the location of the attachment of the subsequent blades to the balance beam is critical because any blade not exactly and identically attached as the reference blade will result in an inaccurate readout. An error of only a few thousandths of an inch could produce such a false value because of the accuracy of the scale Additionally, since a blades' mass-moment is defined as its mass multiplied by the distance of its center of gravity to the measuring location, any such error in location would be magnified accordingly. Consequently, when such a high degree of accuracy is desired, more than accurate equipment is needed, accurate and consistent attachment of the blade to the balance beam is also equally important.

A balance beam (or moment weighing) system now in use requires an operator to manually attach a fan blade to an end of the beam. The potential for error using this method has been discussed above. This system also incorporates a beam dampening device that quickly eliminates any fluctuations of the beam. While an admirable addition, it also introduces error by restricting the free movement of the balance beam. It would be preferable to incorporate the dampening feature into the measuring device itself (i.e. the scale) rather than the thing being measured (i.e. the movement of the balance beam).

Another error-prone aspect of the above system is the location of the measuring cell. Instead of being located at the fulcrum of the balance beam, it is offset some distance from this location. Since the fulcrum is the point from which mass-moment is determined (it being one end of the distance multiplicand), this system requires the additional conversion of the measured data so as to take into account this offset location. Such an additional step can be a source of unintentional error if the conversion factor is wrong or was improperly calculated. Another source of error that should be eliminated so as to obtain an accurate reading concerns environmental factors that affect the sensitive weighing apparatus. These factors include air currents and temperature gradients that are to be avoided if utmost accuracy is desired.

It is thus an object of this invention to provide an accurate and consistent method of calculating the mass-moment of jet engine blades. Another object of this invention is to provide a system that positions the blades to be weighed in the exact, same, and identical position each time. Still another object of this invention is to provide a means for weighing each blade that will result in an accurate mass-moment value with no error due to measuring cell location or dampening device. A further object of this invention is to provide a system of determining the mass-moment of an individual blade which eliminates or avoids any error that may be due to air currents, temperature gradients or other environmental factors. These and other objects and features of this invention will become evident upon further inspection.

SUMMARY OF THE INVENTION

In accordance with the method disclosed herein, the to-be-measured blade is positioned at a first known location so that it can be engaged by robotic means for transportation to a second known position adjacent a second work area. At this second location, the blade is transferred to a weighing beam where the blade is weighed and its mass-moment calculated by multiplying its measured weight by a known preset distance. After this operation, the blade is returned to the first work area where it is automatically deposited so that the cycle can begin over again with a new blade.

DETAILED DESCRIPTION OF THE DRAWINGS

Figure 1:
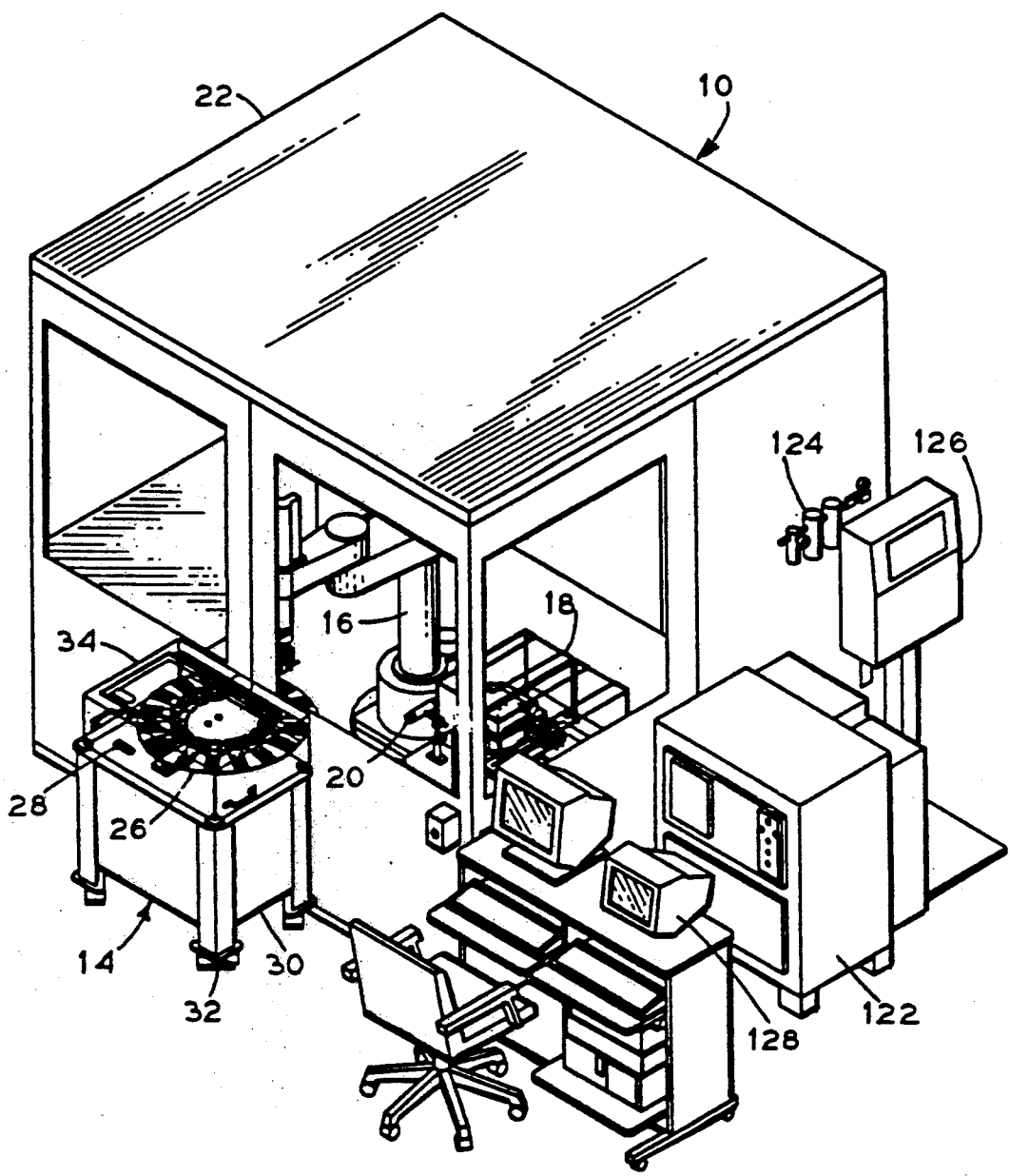
FIG. 1 is a pictorial view of the various assemblies which comprise the process herein disclosed.
Figure 2:
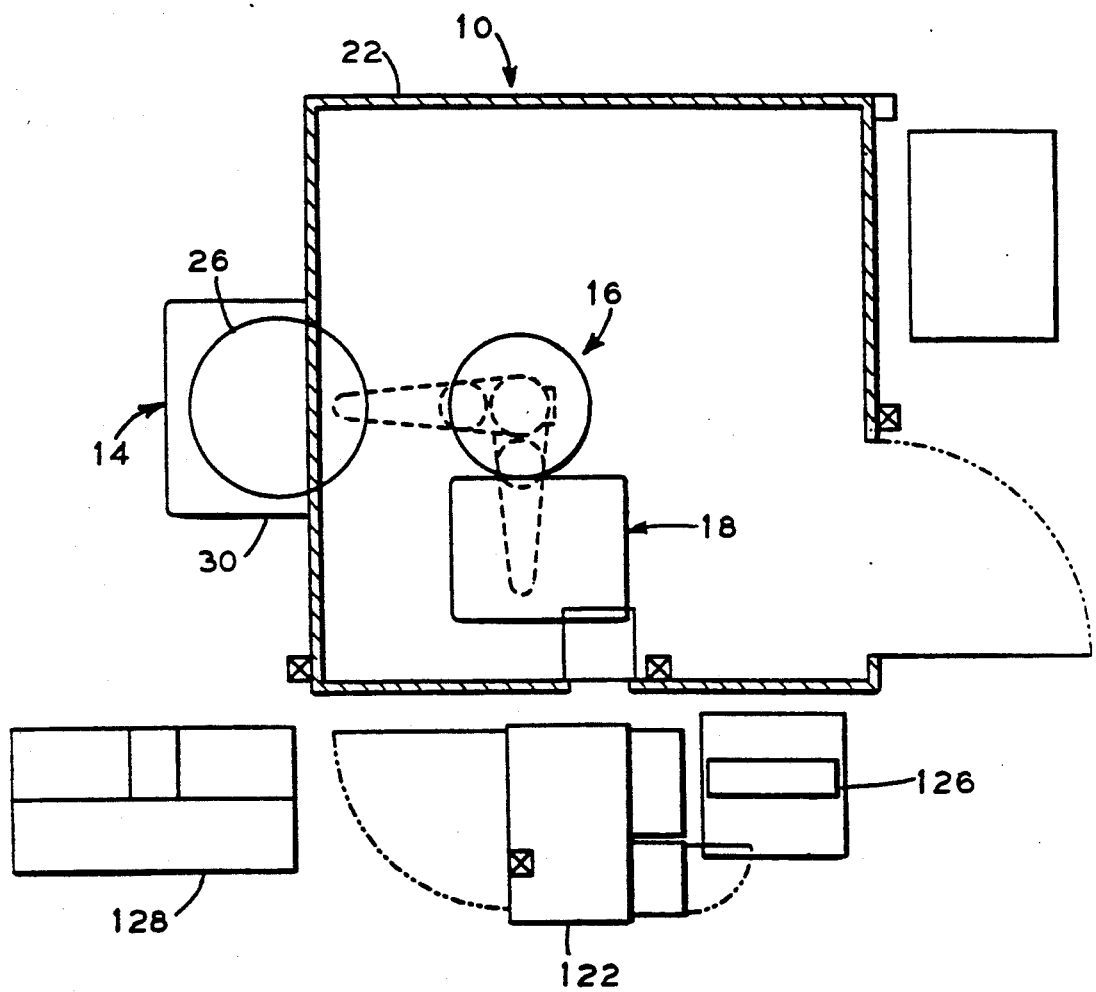
FIG. 2 is a plan pictorial view of the above process.

Referring initially to FIGS. 1 and 2, there is shown a pictorial view and a plan view of the various assemblies which comprise the process disclosed herein. In accordance with this process 10, the individual blades 12 of a jet engine are positioned within load/unload assembly 14. This assembly 14 rotates these individual blades 12 so that robot assembly 16 can engage each such blade 12 in sequence. One by one, robot assembly 16 picks up and delivers blade 12 to inspection/weighing assembly 18 where the mass-moment of this blade 12 is determined. Afterwards, robot assembly 16 maneuvers blade 12 to marker assembly 20 where blade 12 is marked for mass-moment identification purposes. Upon being so marked, robot assembly 16 returns blade 12 to load/unload assembly 14 and prepares to engage the next blade 12 to be measured.

This whole process has, on average, a cycle time of about 40 seconds. Current existing manual systems require as much as 2½ minutes (150 seconds) to perform the same operation. Additionally, improved accuracy is achieved due to the identical and constant steps being performed on each blade 12. Furthermore, by enclosing this process within room or workcell 22 and by providing individual covers for each of the steps involved, any environmental factors such as air currents or temperature gradients which may introduce error are either eliminated or reduced.

Figure 3:
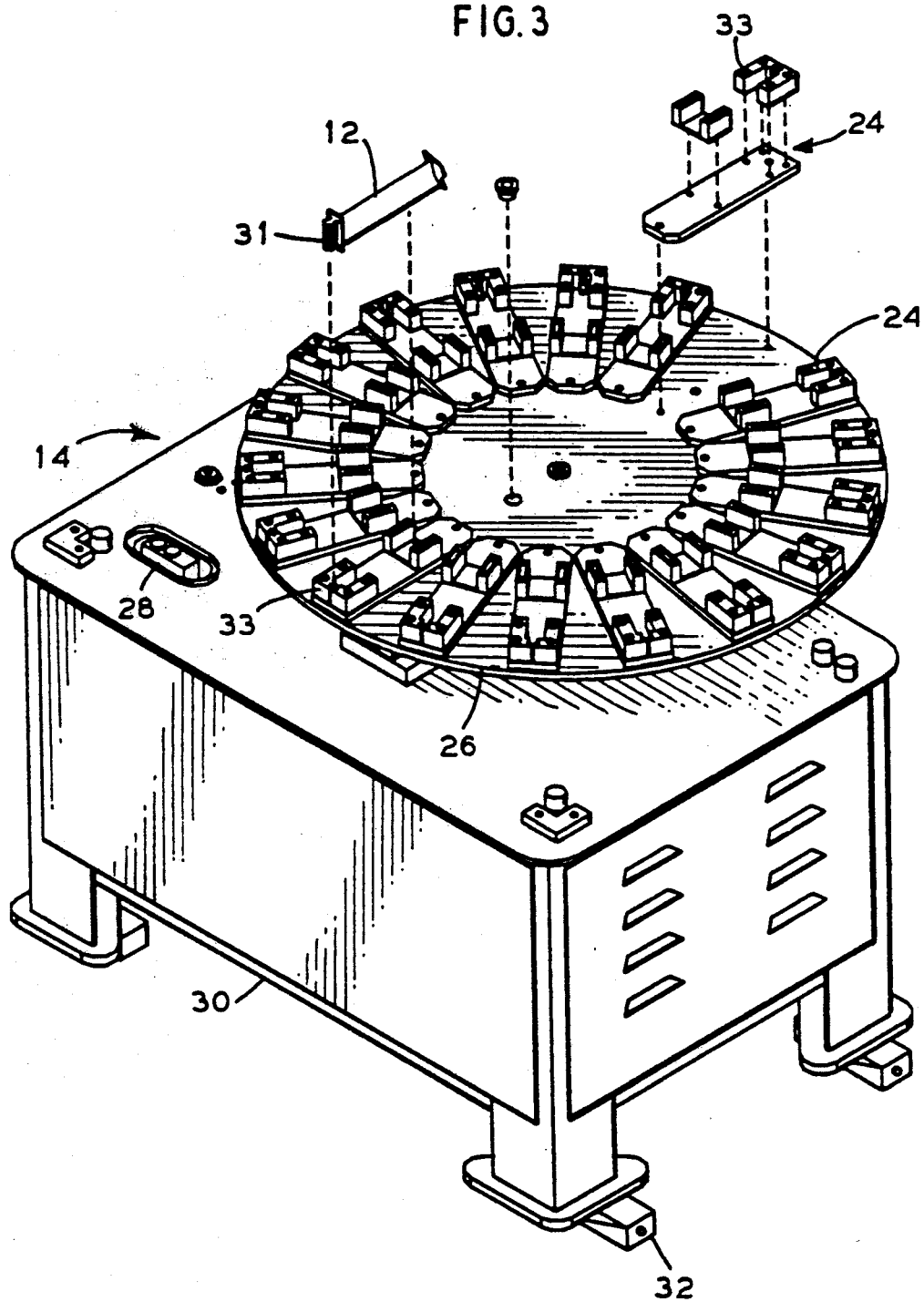
FIG. 3 is a pictorial view of the load/unload station assembly.
Figure 4:
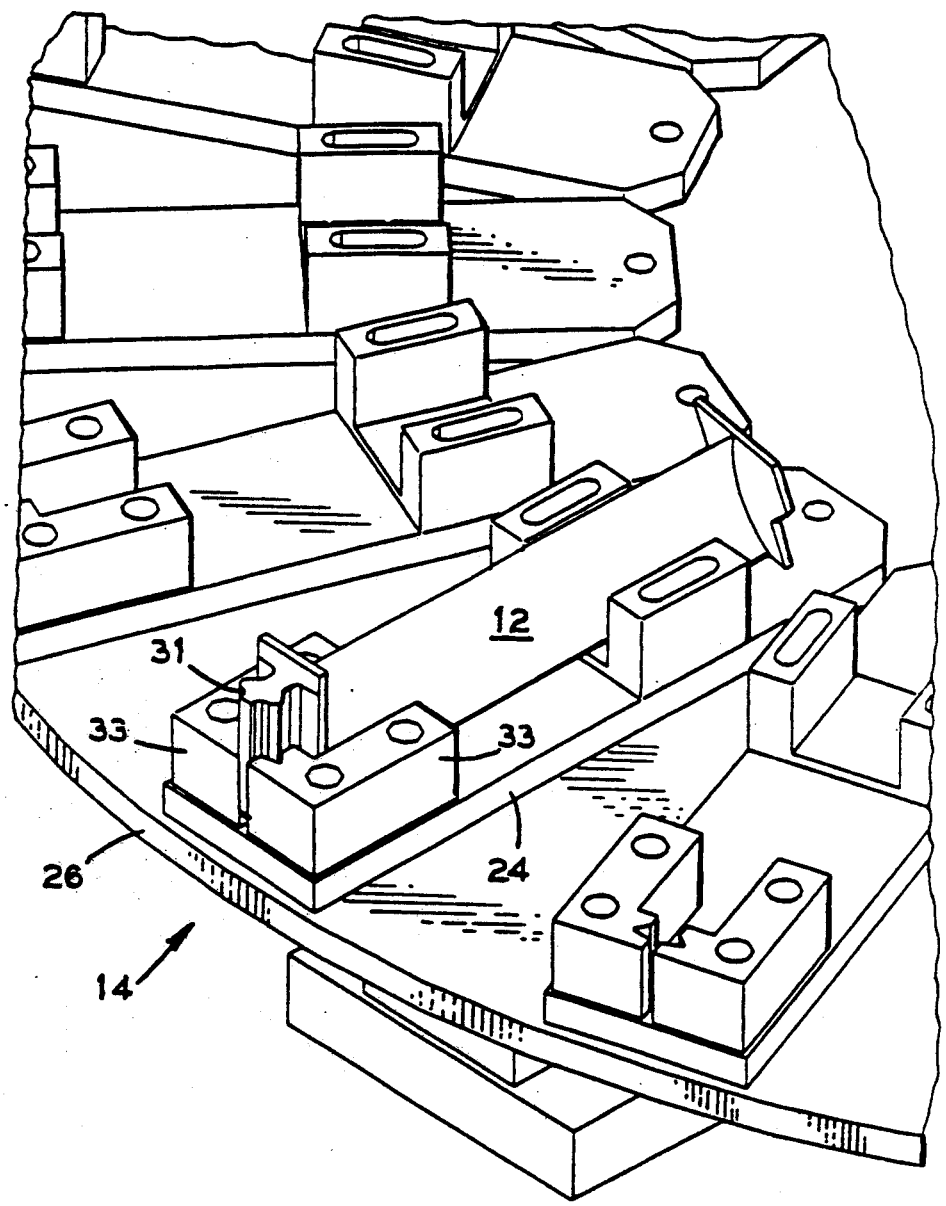
FIG. 4 is a pictorial front view of a molded holder that is located on the load/unload station assembly.

Referring now to FIGS. 3 and 4, load/unload assembly 14 is illustrated in greater detail. The primary purpose of load/unload assembly 14 is to position a blade 12 at a known and consistent location for subsequent engagement by robot assembly 16. To accomplish this, each individual blade 12 is positioned within a molded holder 24. There are a plurality of these molded holders 24 upon platter 26, the actual amount being dependent upon the size of the individual blades 12. As can be imagined, each part type (blade 12) has a dedicated platter 26 to accommodate its respective molded holders 24.

A sensor 28 adjacent platter 26 senses when blades 12 are positioned within molded holders 24 and subsequently causes a motor (not shown) within cabinet 30 to rotate platter 26 as needed. The preferred location of molded holder 24 is dependant upon robot assembly 16, but generally, the location would be as close to robot assembly 16 as possible without necessitating the need for robot assembly 16 to reach over any part of load/unload assembly 14.

As seen in FIG. 4, molded holder 24 supports blade 12 in a horizontal position with root 31 of blade 12 fitting into support block 33. Obviously, differently configured support blocks 33 are utilized for differently configured blade roots 31. The main purpose of molded holder 24, and particularly support block 33, is to retain blade 12 in a fixed, known position so that robot assembly 16 can grip the upper portion of blade root 31 and deliver blade 12 to inspection/weighing assembly 18.

To insure the proper placement of molded holders 24 and their respective blades 12, load/unload assembly 14 is supported upon leveling blocks 32 which also act to reduce and/or eliminate any vibration of load/unload assembly 14. A cover 34 (generally plastic) protects the top area of load/unload assembly 14 and provides operator safety from moving parts. This cover 34 can include a door which is opened whenever a blade 12 is to be installed on or removed from platter 26 by the operator. Obviously, the back side of cover 34 is open so that robot assembly 16 can engage blade 12 after platter 26 is rotated into position. A door sensor can be incorporated to ascertain when the door is either opened or closed and it can be designed as part of an interlock system if such is desired. Adjustments in design are permitted to both platter 26 and molded holder 24 so as to accommodate a variety of differently sized and/or shaped blades 12.

Figure 5:
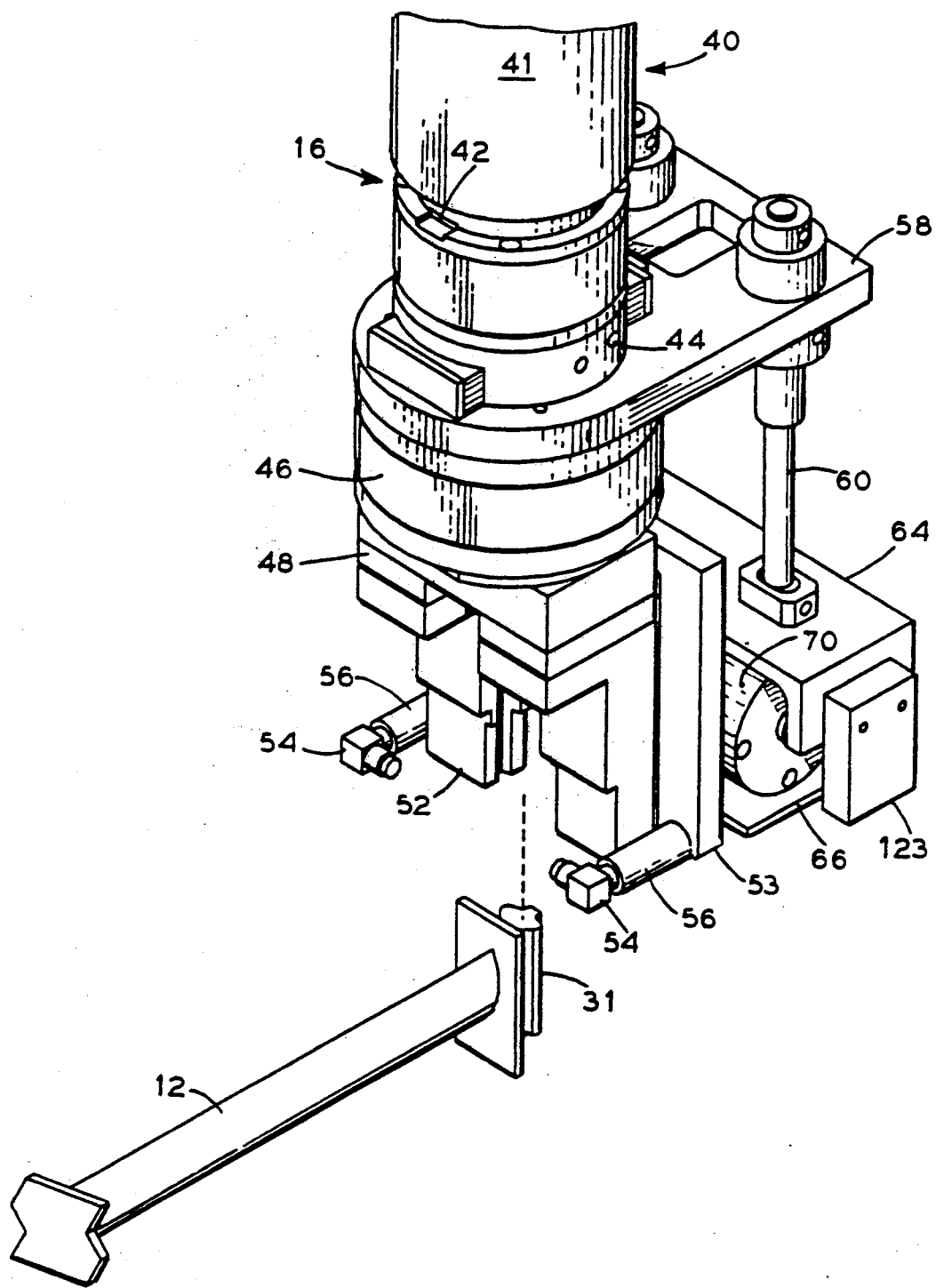
FIG. 5 is a pictorial view of one side of the remote grippers, illustrating how the blade is attached, which are located at ,the end of the robot arm.
Figure 6:
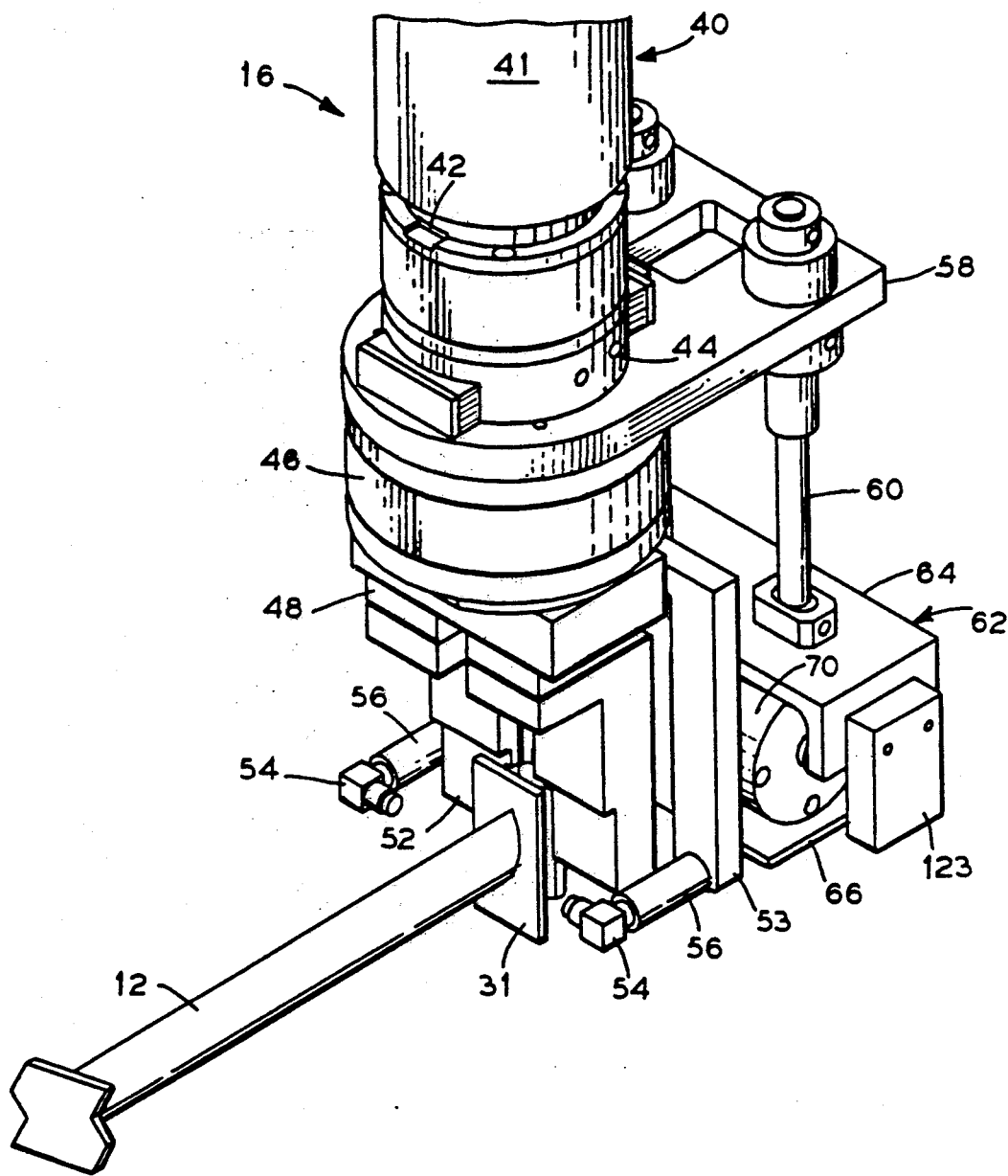
FIG. 6 is a pictorial view of similar to FIG. 5 but with the blade secured to the robot arm.

Referring now to FIGS. 5 and 6, there is shown an enlarged view of one side of tool end 40 of robot assembly 16. Tool end 40 incorporates a robot quill 41 having an orientation notch 42 which insures the proper orientation of tool end 40. In this embodiment, remote center of compliancy device 46, which serves the purpose of compensating for slight misalignments due to blade and fixturing tolerances, is located just below orientation notch 42. Below that is gripper actuator 48 and a robot gripper open sensor (not shown) which determines when gripping fingers 52 are in the open position. Generally, the robot gripper open sensor is an inductive proximity type sensor but it can be another type sensor as well.

Extending outward from tool end 40 on bracket 53, and located on both sides of gripping fingers 52, are presence sensors 54 that are secured to the ends of threaded rods 56. Presence sensors 54 detect the presence of a part (such as blade 12) between them. These sensors 54 aid rounded gripping fingers 52 in engaging and maneuvering blade 12 as programmed. As can also be imagined, tool end 40 incorporates the requisite number of air hose ports and wire lead openings 44 needed for proper operation.

To engage blade 12, robot assembly 16 is positioned over molded holder 24 with fingers 52 in the open position. Tool end 40 is then lowered until blade 12 is sensed as being between presence sensors 54. At this time, actuator 48 closes fingers 52 thereby engaging the upper end of blade root 31. Tool end 40 then lifts blade 12 upward so as to clear molded holder 24.

Figure 7:
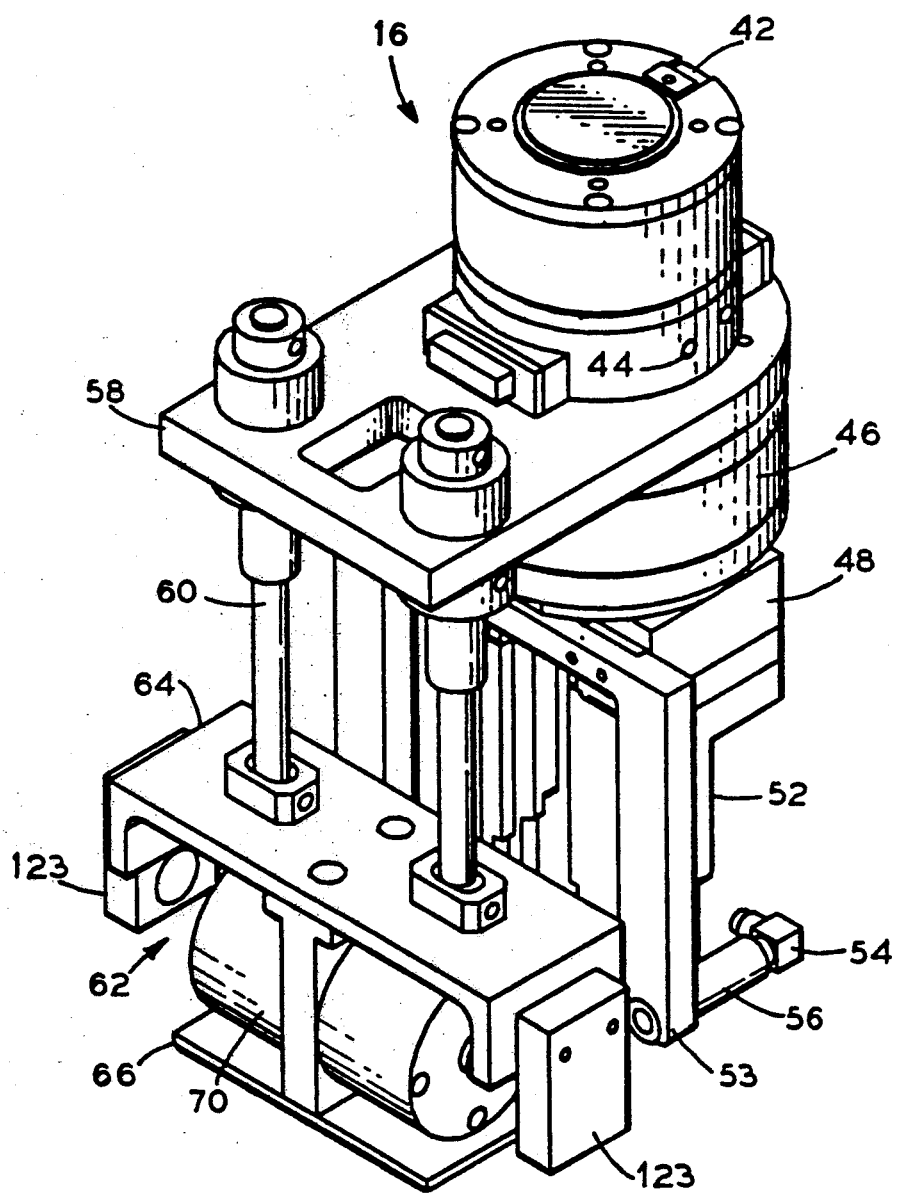
FIG. 7 is a pictorial view of the opposite side of the remote grippers which are located at the end of the robot arm.

Referring now to FIG. 7, there is shown an enlarged view of the other side of tool end 40 of robot assembly 16. This side of tool end 40 supports an adapter plate 58 which, in turn, supports a pair of compressible shafts 60. Each shaft 60 comprises a pair of vertically oriented steel rods which slide within bronze bushings whenever the length of shafts 60 are to be changed. Shafts 60 support gripper housing 62 which incorporates top plate 64 and bottom plate 66. A pair of remote gripper open sensors 68 are secured to the opposite longitudinal ends of top plate 64 and extend downward toward bottom plate 66. The elevation of housing 62 can vary as needed by simply causing shafts 60 to slide within their respective bushings.

Located within housing 62 are a pair of air cylinders 70 that are operated to open and close the grippers located within inspection/weighing assembly 18. This side of tool end 40 also incorporates the necessary openings for air hoses and wire leads required for operation. Additionally, and as can be assumed, the various components of robot assembly 16 are movable and/or adjustable for proper placement and orientation.

During operation, housing 62 (and more specifically bottom plate 66) initially contacts its counterpart on inspection/weighing assembly 18 before fingers 52 release their grip on blade 12. This is accomplished as a result of the vertical travel permitted by shafts 60. Thus, after housing 62 engages inspection/weighing assembly 18, tool end 40 continues to move downward until blade 12 is properly positioned with respect to inspection/weighing assembly 18. In this fashion, before blade 12 is released by robotic assembly 16 but after housing 62 (or bottom plate 66) engages its counterpart, air cylinders 70 are operated to open the grippers located within inspection/weighing assembly 18 so that the continued downward movement of robot assembly 16 can transfer blade 12 to the now open grippers of inspection/weighing assembly 18.

Figure 8:
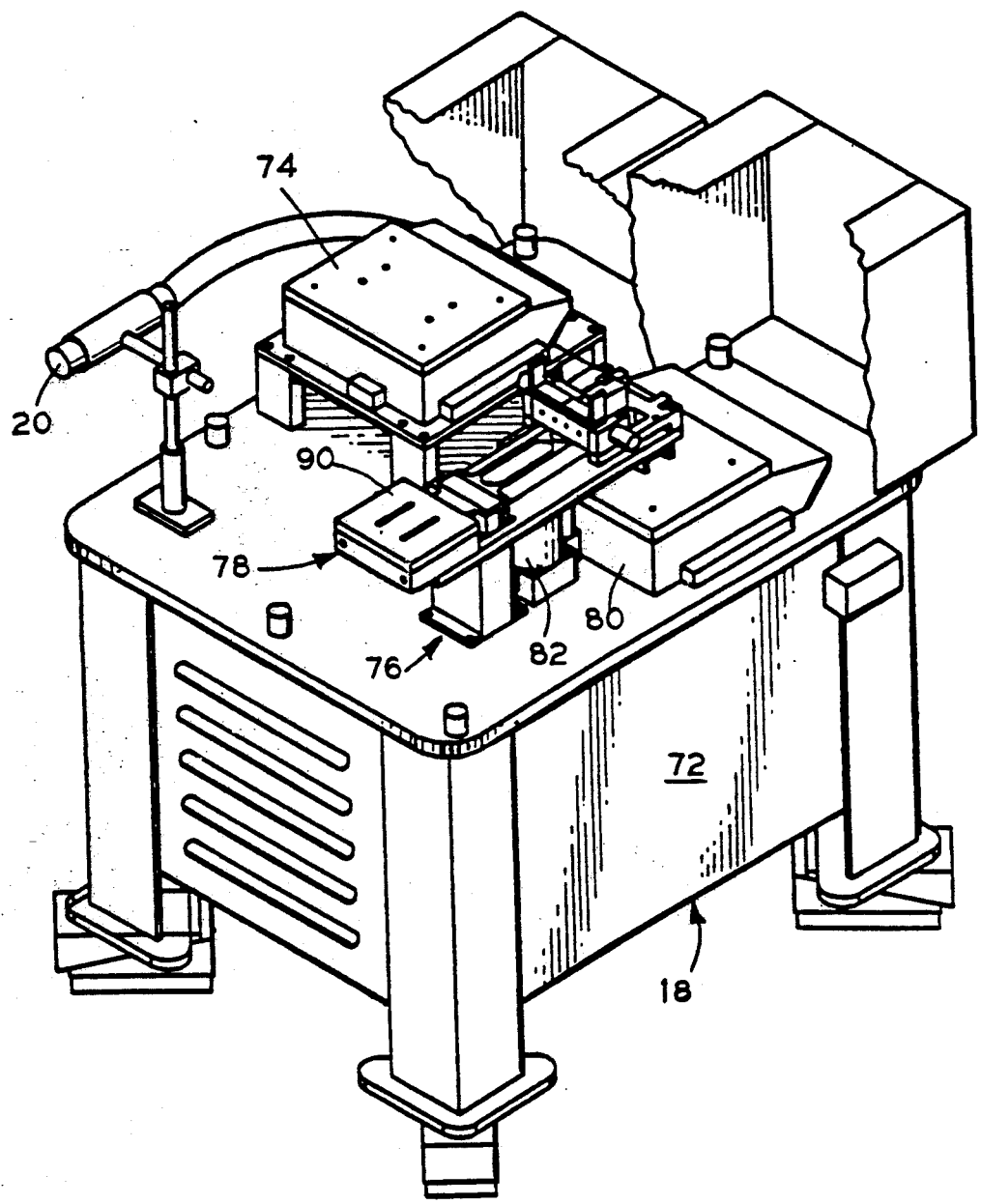
FIG. 8 is a pictorial view of the weighing station assembly.

Referring now to FIG. 8, there is shown both inspection/weighing assembly 18 (which is under a cover) and marker assembly 20 (which is outside the cover). Inspection/weighing assembly 18 is located upon cabinet 72 whose legs have also been properly leveled and isolated from vibration. Assembly 18 incorporates mass scale 74 and moment weighing system 76. Mass scale 74 measures the weight (mass) of blade 12 while moment weighing system 76 determines the mass-moment of blade 12. Moment weighing system 76 incorporates weighing beam assembly 78, a separate moment scale 80, and lift mechanism 82 for lifting weighing beam assembly 78 above moment scale 80. Lift mechanism 82 is activated via solenoid controlled pneumatic lift cylinder 94.

Figure 9:
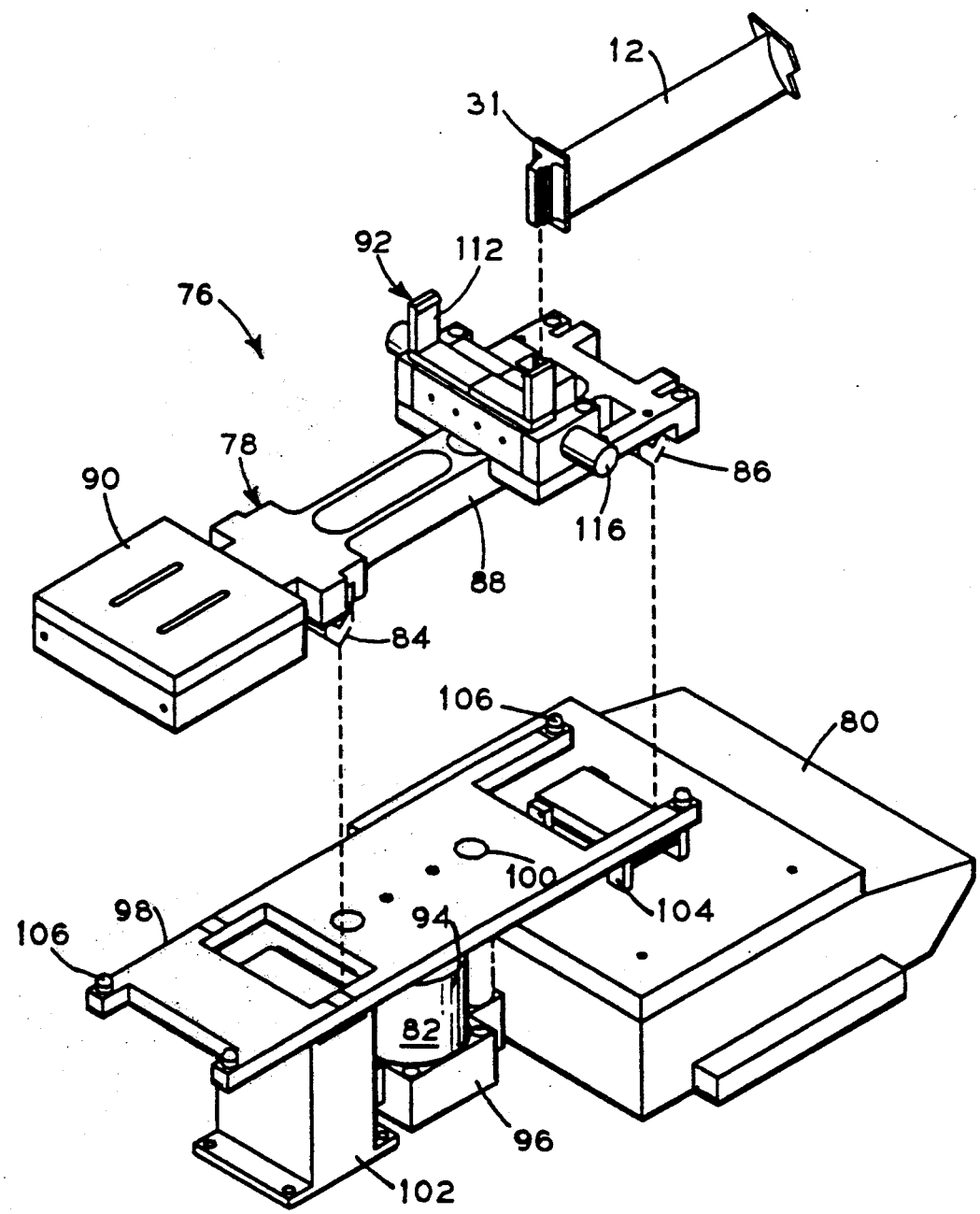
FIG. 9 is an exploded pictorial view of the mass-moment weighing beam system which is located on the weighing station assembly illustrating how the blade is attached.
Figure 10:
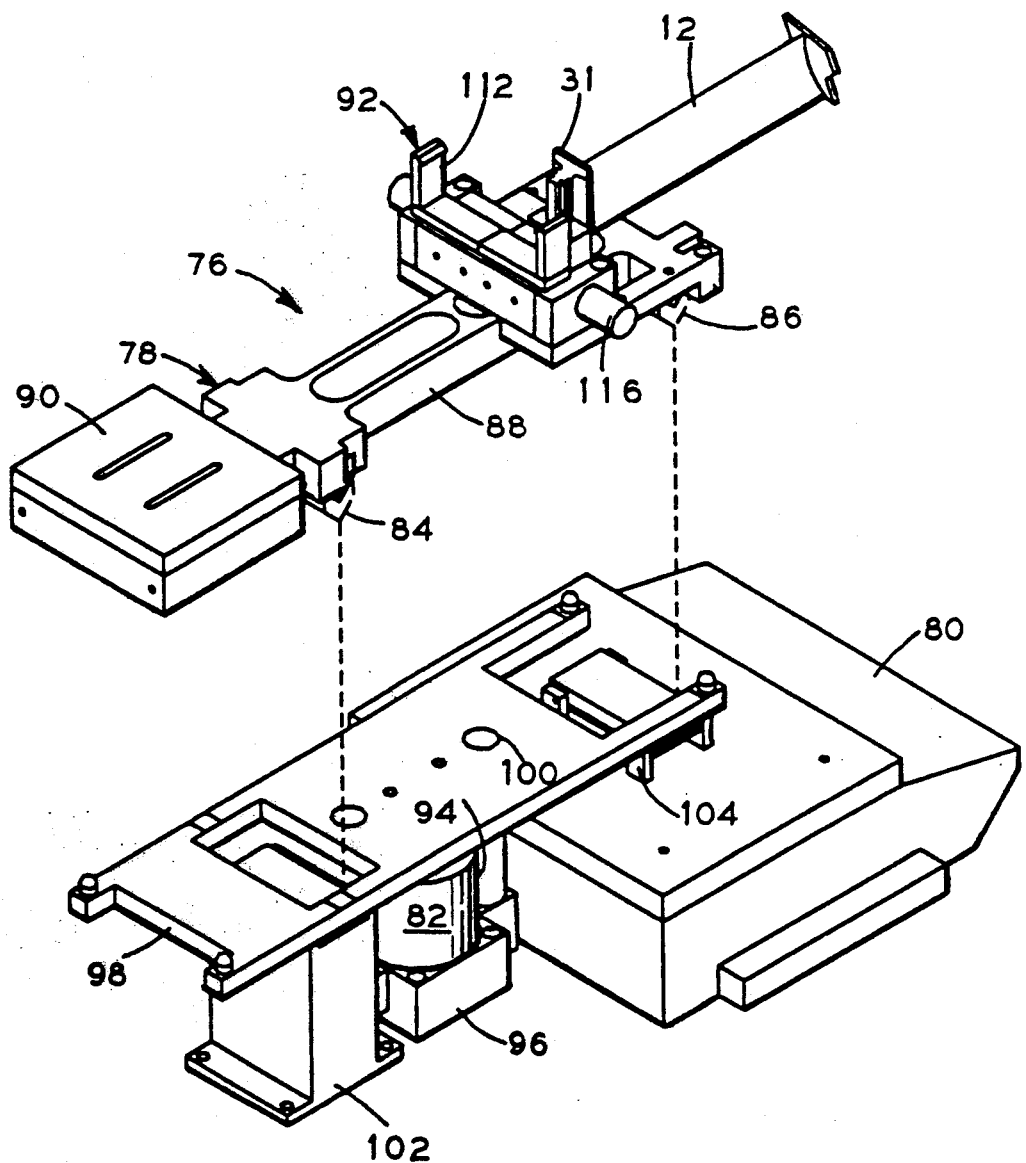
FIG. 10 is an exploded pictorial view the same as FIG. 9 but with the blade attached.

Referring now to FIGS. 9 and 10, moment weighing system 76 is shown in greater detail and especially weighing beam assembly 78 and its lift mechanism 82. Weighing beam assembly 78 incorporates two "knife edges", fulcrum knife edge 84 and scale knife edge 86 located a known, set distance from each other. Fulcrum knife edge 84 represents the center-line of the assembled jet engine with the distance between between knife edge 84 and the position of gripped blade 12 being the same as the moment arm found in the assembled engine. It is the distance between knife edges 84 and 86 which is a multiplicand for the determination of the mass-moment. The other multiplicand is the value measured by moment scale 80. As can be seen, while neither the actual mass of blade 12 nor the location of its center-of-mass is known, the mass-moment of blade 12 can be determined by multiplying the distance between knife edges 84 and 86 by the value measured by moment scale 80.

Weighing beam assembly 78 is composed of beam 88 (from which knife edges 84 and 86 extend), optional counterweight 90, and gripping assembly 92. Obviously, gripping assembly 92 is designed to grip the item to be measured (blade 12), and it is movable along beam 88 so as to accommodate a variety of differently sized blades 12 and different distances between knife edge 84 and the position of the gripped blade.

Lift mechanism 82 comprises lift cylinder 94, base 96, platform 98, and two vertical guides 100 which properly align platform 98. Platform 98 is configured with at least two open areas therein so that platform 98 can be lowered around fixed primary fulcrum block 102 and around scale fulcrum block 104. A series of tapered positioning pins 106 are secured to platform 98 and they are located so as to engage and support weighing beam assembly 78 upon platform 98. In this fashion, weighing beam assembly 78 can be lifted off both fulcrum blocks 102 and 104 to protect knife edges 84 and 86 whenever a blade 12 is being loaded upon weighing beam assembly 78 by robot assembly 16. When thusly loaded, lift cylinder 94 is activated to lower platform 98 around fulcrum blocks 102 and 104 thereby leaving weighing beam assembly 78 resting upon fulcrum blocks 102 and 104 via knife edges 84 and 86. The force of scale knife edge 86 upon moment scale 80 is then determined and multiplied by the distance between knife edges 84 and 86 so as to calculate the mass-moment of blade 12.

It is important during this operation that the portion of platform 98 which extends over moment scale 80 and around scale fulcrum block 104 does not come into contact with moment scale 80 or else the value measured by scale 80 will be in error. This can be easily accomplished by either increasing the height of scale fulcrum block 104 thereby providing more space or by installing a stop along vertical guides 100 or elsewhere which will prevent the further lowering of platform 98.

Prior to attaching blade 12 to weighing beam assembly 78, scale 80 must be calibrated. Scale 80 is set to zero with weighing beam assembly 78 (minus blade 12) resting upon both of its associated fulcrum blocks 102 and 104. It is to be determined at this time whether counterweight 90 is to be used or not. If it is to be used, then the effect of both counterweight 90 and weighing beam assembly 78 upon scale 80 is set to zero. If counterweight 90 is not to be used, then only the effect of weighing beam assembly 78 on scale 80 is set to zero. Counterweight 90 is used merely for the convenience of attaching blade 12 to weighing beam assembly 78, it is to have no effect upon any measurement taken. Scale 80 is to measure only the load due to blade 12, all other factors being "zeroed out".

Figure 11:
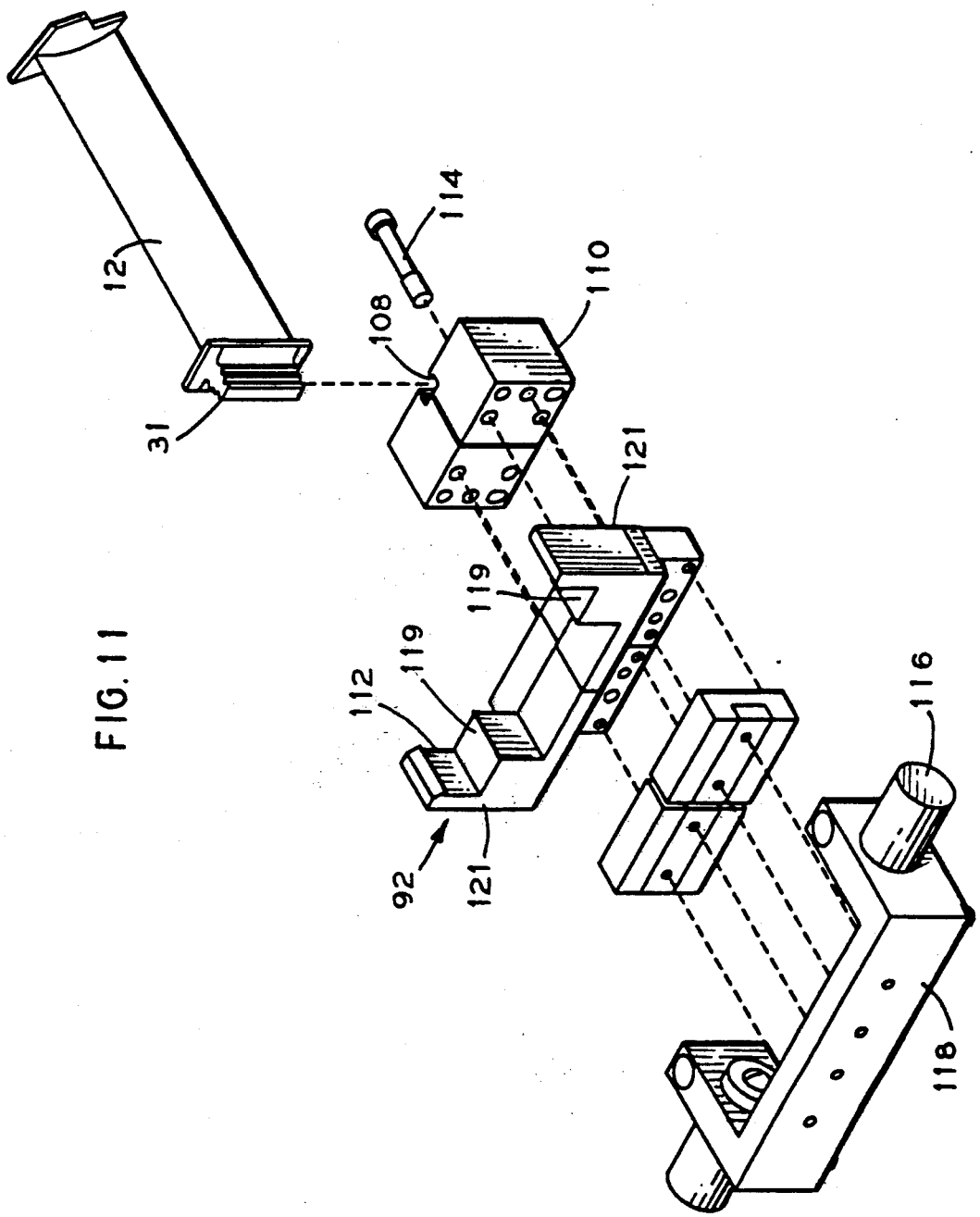
FIG. 11 is an exploded pictorial view of the mass-moment weighing beam gripping fixture.

Referring now to FIG. 11, there is shown an exploded view of weighing beam gripping assembly 92. As shown, root 31 of blade 12 is set within notch 108 in blocks 110. Blocks 110 are, in turn, secured to their respective gripper 112 via screws 114. Grippers 112 (and blocks 110) can be moved closer together or farther apart depending upon the action of spring plungers 116 attached to holder 118. Spring plungers 116 are generally in the closed position, but can be compressed so as to open up blocks 110 in order to accept a blade 12 therein. Gripping assembly 92 can slide linearly along beam 88 via linear slides so that a variety of differently sized blades 12 can be accommodated.

During operation, grippers 112 and blocks 110 are opened or moved apart by robot assembly 16. Bottom plate 66 of housing 62 on robot assembly 16 is lowered until it rests upon middle step 119 of gripper 112. The vertical portion 121 of gripper 112 should now be intermediate its respective air cylinder 70 and gripper open sensor 123 (FIG. 7). Air cylinders 70 of robot assembly 16 are then operated to engage Vertical portion 121 causing grippers 112 to open or move outward against the bias of spring plungers 116. When thus opened, robot tool end 40 (containing blade 12) continues downward while air cylinders 70 remain stationary (shafts 60 being "compressed" during such movement). This permits blade 12 to be transferred from gripping fingers 52 of robot assembly 16 to within notch 108 of the now open blocks 110 of weighing beam gripping assembly 92. Once the transfer is completed, air cylinders 70 are retracted thereby also causing the retraction of grippers 112 (via spring plungers 116) and the compression of root 31 of blade 12 by blocks 110. Robot assembly 16 then releases its grip on blade 12 and withdraws (moves upward) while weighing beam assembly 78 is lowered via lift mechanism 82. As knife edges 84 and 86 come to rest upon their respective fulcrums 102 and 104, the weight registered by moment scale 80 is recorded. This value is eventually multiplied by the distance between knife edges 84 and 86 so as to determine this particular blade's mass-moment.

Figure 12:
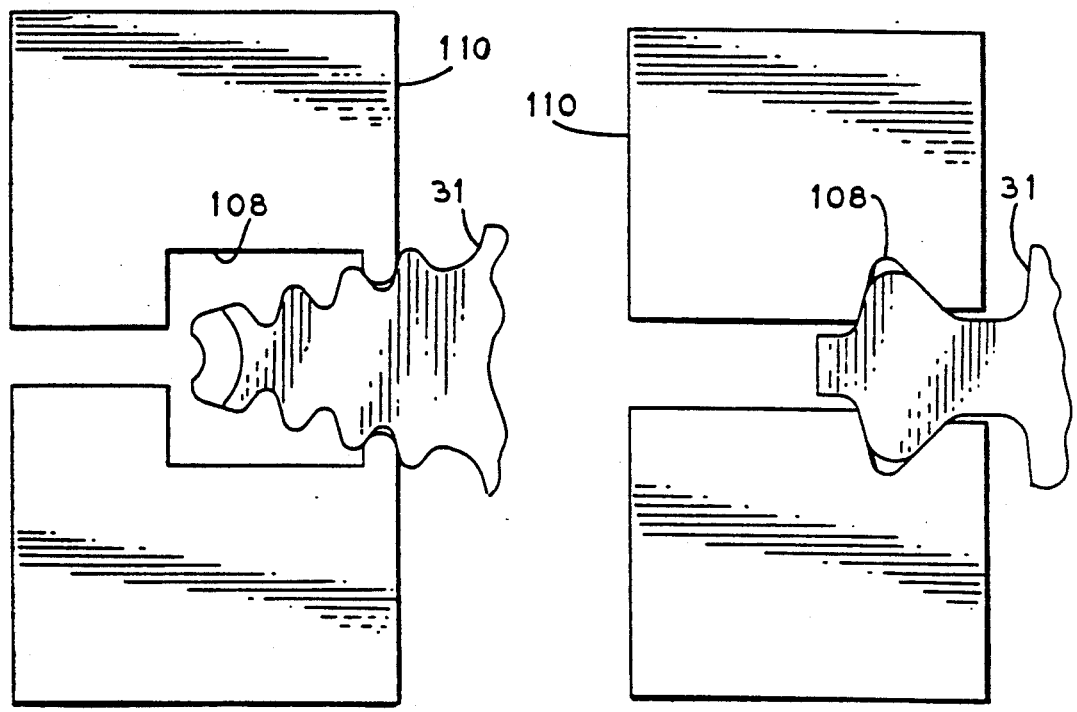
FIG. 12 is a pictorial view of the various configurations of the blocks that support the blade upon the mass-moment weighing beam gripping fixture.

FIG. 12 discloses different configurations for notch 108 of blocks 110. These different configurations are needed so that root 31 may be gripped exactly where it will be gripped when installed in a jet engine with respect to engine centerline (fulcrum knife edge 84). The place of contact is often referred to as the datum plane for calculation purposes.

With this system, accurate measurements are made possible by locating each individual blade 12 in the same exact position with respect to the center-line of the jet engine as they will be in when the entire rotor is properly installed in the jet engine. This exact positioning is accomplished by the automated method of gripping and locating blade 12 for measurement. More specifically, this positioning is accomplished by the manner of gripping blade 12 by gripping fingers 52 and locating blade 12 within weighing beam assembly 78. Additionally, the ability to control the distance between knife edges 84 and 86 is achieved by positioning pins and tightly machined receiving holes located on beam 88. Small deviations in the position of blade 12 can be accommodated in the design of gripping fingers 52. Larger variations are accommodated by the design and the repositioning of the gripping assembly 92 on beam 88.

When the measuring step is completed, lift mechanism 82 raises weighing beam assembly 78 to again be positioned for engagement by robot assembly 16. Blade 12 is then transferred back to robot assembly 16 by causing air cylinders 70 to again force grippers 112 (and blocks 110) open against the pressure of spring plungers 116. Gripping fingers 52 of robot assembly 16 then re-engage blade 12 and remove it from between blocks 110 after which air cylinders 70 are closed. Robot assembly 16 then passes blade 12 to marker assembly 20 (FIG. 8) for identification purposes before returning blade 12 to load/unload assembly 14. Upon depositing blade 12 within its respective molded holder 24, platter 26 rotates so that robot assembly 16 can engage another blade 12 thereby beginning the cycle over again. Robot assembly 16 deposits blade 12 within molded holder 24 about one-half inch closer to the center of platter 26 so that the operator can easily identify which blades 12 have been measured and which ones still need to be measured.

Control of this operation is accomplished by adjacent control center 122 which controls the movement of all the assemblies discussed herein including load/unload assembly, robot assembly 16, and inspection/weighing assembly 18. The actuators and sensors involved in picking blade 12 up from molded holder 24, delivering blade 12 to weighing beam assembly 78, and returning blade 12 to platter 26 are likewise controlled from control center 122. Air for the operation of air cylinders 70 is also provided for by pneumatic system 124. Identification of the individual blades' measured mass-moment is controlled by marker assembly controller 126 Both on-line and off-line programming terminals 128 are provided to make any correction that may be needed to perfect this mass-moment measuring cycle.

Additionally, any dampening needed by this system is accomplished by moment scale 80 which eliminates the requirement for additional structure dedicated solely to dampening beam 88. Consequently, the value recorded by scale 80 is directly proportional to the true "mass-moment" of blade 12 such that the value determined herein is usable for identifying the mass-moment of blades 12 for selective assembly to aid in balancing jet engines.

Besides the speed (a cycle time of about 40 seconds), accuracy (about 0.02% of the blades' mass-moment), and efficiency (assembly of highly balanced blades) of this system, the use of an "ideal" or "standard" blade is not required nor is the use of a counterweight mandatory.

What is claimed is:

1. A method of determining the mass-moment of a blade comprising the steps of:
   a) positioning an individual blade at a first work area within an enclosed chamber, said first work area being accessible from outside said enclosed chamber;
   b) engaging the blade at said first work area by robotic means within said enclosed chamber for transporting the blade from said first work area to a second work area also located within said enclosed chamber;
   c) automatically transferring the blade at said second work area from said robotic means to a weighing beam;
   d) weighing the blade at said second work area via engagement of said weighing beam with a weighing scale, and transmitting the weight measured by said weighing scale to processing means for determination of the mass-moment of the blade;
   e) disengaging the blade from said weighing beam; and,
   f) automatically returning the blade from said second work area to said first work area via said robotic means for subsequent removal of the blade from said enclosed chamber.

2. The method as set forth in claim 1 further comprising the step of individually identifying each such blade within said enclosed chamber and transmitting such identity to said processing means.

3. The method as set forth in claim 2 wherein said positioning step comprises the step of initially installing the blade in a blade holder.

4. The method as set forth in claim 3 wherein said blade holder is attached to a rotatable platter containing several such blade holders.

5. The method as set forth in claim 4 wherein said robotic means removes the blade from said blade holder.

6. The method as set forth in claim 5 wherein said weighing beam comprises gripping means for gripping the blade from said robotic means.

7. The method as set forth in claim 6 wherein said gripping means on said weighing beam are activated by said robotic means.

8. The method as set forth in claim 7 further comprising the step of raising said weighing beam prior to engaging said robotic means.

9. The method as set forth in claim 8 further comprising the step of lowering said weighing beam with the blade secured thereto prior to weighing the blade at said second work area.

10. The method as set forth in claim 9 wherein the step of weighing the blade is accomplished by lowering said weighing beam upon said weighing scale.

11. A method of determining the mass-moment of a blade comprising the steps of:

a) engaging the blade at a first workstation location by a robotic assembly and transporting it via said robotic assembly to a second workstation location, said robotic assembly and both said first and second workstation locations being located within an enclosed chamber with said first workstation location being accessible from outside said enclosed chamber;

b) automatically transferring the blade at said second workstation location to a weighing beam, said weighing beam engaging the root end of the blade;

c) measuring the force of the blade on said weighing beam by resting said weighing beam upon a scale;

d) transmitting the force measured by said scale to processing means for determination of the mass-moment of the blade;

e) raising said weighing beam off said scale and disengaging the blade from said weighing beam so as to transfer the blade back to said first workstation location for subsequent removal from said enclosed chamber; and, f) marking the blade for identification purposes.

12. The method as set forth in claim 11 wherein said first workstation location comprises a rotatable platter from which the blade is engaged by said robotic assembly.

13. The method as set forth in claim 12 wherein said weighing beam comprises gripping means for gripping the blade from said robotic assembly.

* * * * *